(12) United States Patent
Nakata

(10) Patent No.: US 6,335,809 B1
(45) Date of Patent: Jan. 1, 2002

(54) OPTICAL PICKUP AND HOLOGRAM DEVICE

(75) Inventor: Naotaro Nakata, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 09/647,851

(22) PCT Filed: Feb. 9, 2000

(86) PCT No.: PCT/JP00/00729
§ 371 Date: Oct. 3, 2000
§ 102(e) Date: Oct. 3, 2000

(87) PCT Pub. No.: WO00/48176
PCT Pub. Date: Aug. 17, 2000

(30) Foreign Application Priority Data

Feb. 10, 1999 (JP) .......................................... 11-032497

(51) Int. Cl.[7] ................................................ G02B 5/32
(52) U.S. Cl. ....................................... 359/15; 359/566
(58) Field of Search ................................ 359/15, 566

(56) References Cited

U.S. PATENT DOCUMENTS

| 4,907,847 A | 3/1990 | Onayama et al. |
| 5,410,468 A | 4/1995 | Horinouchi |
| 5,881,035 A | 3/1999 | Ueyama |
| 6,072,607 A * | 6/2000 | Tajiri et al. ................ 359/15 |

FOREIGN PATENT DOCUMENTS

| EP | 0 467 216 | 1/1932 |
| EP | 0 581 519 | 2/1994 |
| JP | 64-86337 | 3/1989 |
| JP | 4-212742 | 8/1992 |
| JP | 6-290481 | 10/1994 |
| JP | 9-161282 | 6/1997 |

* cited by examiner

Primary Examiner—Darren Schuberg
(74) Attorney, Agent, or Firm—Hoffman & Baron, LLP

(57) ABSTRACT

An optical pickup includes a hologram unit. The hologram unit includes a hologram pattern formed circular by dividing into two and then joining together first and second patterns formed in the entire circular region. The first pattern is designed to minimize a sub-beam spot on a light-receiving device based on an optical path length and wavelength when a +1-order sub-beam is taken as a light source. The second pattern is designed to minimize the sub-beam spot on the light-receiving device based on an optical path length and wavelength when a −1-order sub-beam is taken as a light source.

4 Claims, 6 Drawing Sheets

(A)

(B)

OPTICAL PICKUP AND HOLOGRAM DEVICE

TECHNICAL FIELD

This invention relates to an optical pickup and hologram unit and, more particularly, to an optical pickup and hologram unit for diffracting reflection light from an optical disk (hereinafter, referred to merely as "disk"), such as a CD or DVD, and converging it onto a light-receiving device.

PRIOR ART

The optical pickup for reading information out of a disk requires a function to reproduce recorded information as well as a function to detect focus error and tracking error. Conventionally, focus error has been detected by the well-known Foucault or astigmatism method while tracking error by the push-pull or three-beam method. Where using the Foucault and three-beam methods in combination, the light receiving elements $2a$–$2c$ for receiving a main beam and the light receiving elements $3a$ and $3b$ for receiving sub-beams have been employed as shown, for example, in FIG. 9. Focus error signals are determined from the difference of output signals between the light receiving elements $2a$ and $2b$ ($S2a$–$S2b$). Tracking error signals are determined from the difference of output signals between the light receiving elements $3a$ and $3b$ ($S3a$–$S3b$).

Because the sub-beam light reflected upon the disk passes obliquely through a lens, division is not equally two by the hologram unit 4 (FIG. 9) and hence the two sub-beams divided are not same in spot size. Consequently, the sub-beam diffracted as greater spot size (hereinafter, referred to as "aperture side") after division and the sub-beam diffracted as smaller spot size (hereinafter, referred to as "shade side") are not in symmetry on a light receiving surface of the photodetector 1. On the light-receiving surface, the spot size of the shade-side sub-beam B is greater than the spot size of the aperture-side sub-beam A.

Meanwhile, in the conventional pattern design for a hologram unit 4, it has been emphasized that wavefront aberration be reduced for a main beam. However, large wavefront aberration remains left for sub-beams. That is, as shown in FIG. 10, conventionally a first pattern 6 and a second pattern 7 have been designed which are to be expressed as an even function $Ax4+Bx2+C$ with respect to a distance x from a division line 5. These patterns have been divided into two and then joined together, thereby obtaining a whole pattern. In the pattern design, however, wavefront aberration has not been taken into consideration for sub-beams.

Due to this, there is a fear that the shade-side sub-beam B be possibly out of the light receiving elements $3a$ and $3b$, as shown in FIG. 9. There has been a problem that the tracking error balance and jitter might vary significantly depending upon temperature change, resulting in unstable optical pickup characteristics.

SUMMARY OF THE INVENTION

Therefore, it is a primary object of this invention to provide an optical pickup capable of stabilizing the characteristics of the optical pickup.

A first invention is an optical pickup, comprising: a diffraction element for dividing a laser beam from a laser device into one main beam and two sub-beams; a lens for converging the main beam and the sub-beams onto a disk; a hologram unit divided into two of a first pattern and a second pattern to respectively diffract reflection light from the disk; and a photodetector including a first portion to receive the main beam and a second portion to receive the sub-beams respectively diffracted by the first pattern and the second pattern; wherein the first pattern and the second pattern in the hologram unit is made to minimize the spot of the sub-beam converging onto the second portion based on an optical length and a wavelength when the sub-beams are taken as light sources.

A second invention is a hologram unit, comprising: a hologram pattern for diffracting and converging onto a light receiving element two sub-beams reflected by a disk, the hologram pattern being made to minimize a spot of the sub-beams converging onto the second portion based on an optical path length and a wavelength when the sub-beams are taken as light sources.

Because the pattern on the hologram unit is designed to minimize a spot size of a sub-beam converging onto the light receiving device based on an optical path length and a wavelength when the sub-beam is taken as a light source, there is no fear that the sub-beam spot goes out of a light receiving surface of the light receiving device.

According to the invention, the optical pickup characteristics can be stabilized because the sub-beam spot can be prevented from going out of the light receiving surface.

The above described objects and other objects, features, aspects and advantages of the present invention will become more apparent from the following detailed description of the present invention when taken in conjunction with the accompanying drawings.

BEST FORM FOR PRACTICING THE INVENTION

Figure 1:
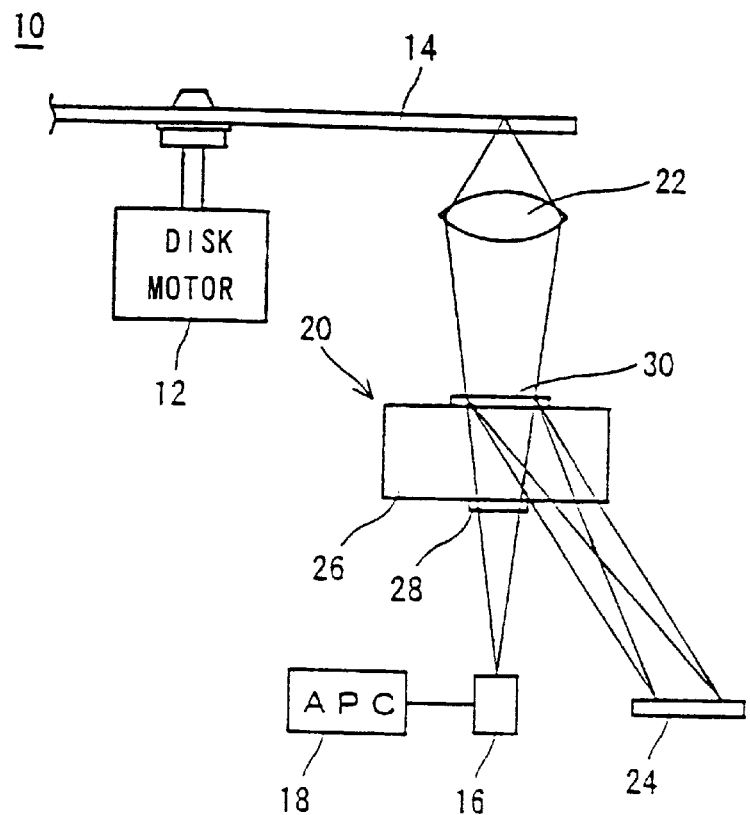
FIG. 1 is an illustrative view showing an optical pickup of one embodiment of this invention.

An optical pickup 10 of this embodiment shown in FIG. 1 is to read information out of a disk 14, such as a CD or DVD, rotated by a disk motor 12, and includes a semiconductor laser device 16 as a light source to emit a predetermined wavelength of laser light. The semiconductor laser device 16 is connected with an APC (Automatic Power Control) 18 so that the output of the semiconductor laser device 16 is under control of the APC 18. Also, a hologram unit 20 as a diffraction unit and an objective lens 22 are arranged between the semiconductor laser device 16 and the disk 14. A photodetector 24 (FIG. 2) is arranged obliquely below the hologram unit 20.

The hologram unit 20 includes a substrate 26 formed of quartz glass or the like. The substrate 26 has a grating pattern 28 formed in an underside to cause one main beam and two sub-beams. The substrate 26 has a hologram pattern 30 for polarization formed in a top surface thereof. The hologram pattern 30 is divided by a division line A0 extending radially of the disk 14, as shown in FIG. 2, to have a first pattern 30a and a second pattern 30b that are different in pitch length from each other.

The objective lens 22 is fixed on a not-shown actuator coil constituting a focussing actuator so as to be vertically displaced by energizing the actuator coil.

Figure 2:
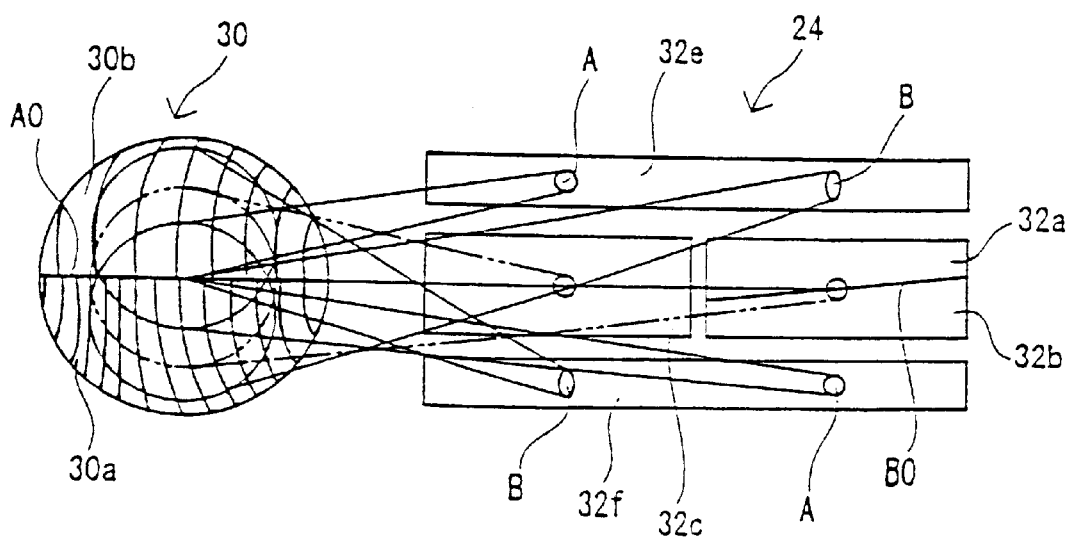
FIG. 2 is an illustrative view showing a photodetector used in the FIG. 1 embodiment.

The photodetector 24 is divided into five light receiving elements 32a, 32b, 32c, 32e and 32f, as shown in FIG. 2. A division line B0 separating the light receiving elements 32a and 32b is formed at a slight angle with respect to a direction of diffraction by the hologram pattern 30 (FIG. 2), in order to prevent focus offset.

Generally the diameter d of a spot (aeri-disk), restricted to a beam wavelength $\lambda$ by an objective lens having a numerical aperture NA, is to be expressed as $d=1.22\ \lambda/NA$. Provided that the NA of the objective lens 22 on a side of the semiconductor laser 16 is NAL and the NA of the main beam (0-order light) after division by the hologram pattern 30 is NAO, expression is given as NAO=NAL/2 because the main beam (0-order light) is equally divided by the hologram pattern 30. Consequently, the spot diameter d0 of the main beam (0-order light) is expressed as $d0=2.44\ \lambda/NAL$. On the other hand, the sub-beam is divided in a position deviated from the center. Accordingly, as shown in FIG. 2, the spot of an aperture-side sub-beam is rendered small on the light receiving elements 32e and 32f whereas the spot of a shade-side sub-beam B is in a highly blurred state on the light receiving elements 32e and 32f. Consequently, there is a need to set a width of the light receiving element 32e and 32f wider than the size of the shade-side spot. However, if this width is set excessively wide, the chip size increases. Accordingly, in this embodiment, a hologram pattern 30 is designed so that the spot size of a sub-beam on the light receiving element 32e and 32f can be minimized in size based on an optical path length and wavelength where the sub-beam is taken as a light source.

Figure 3:
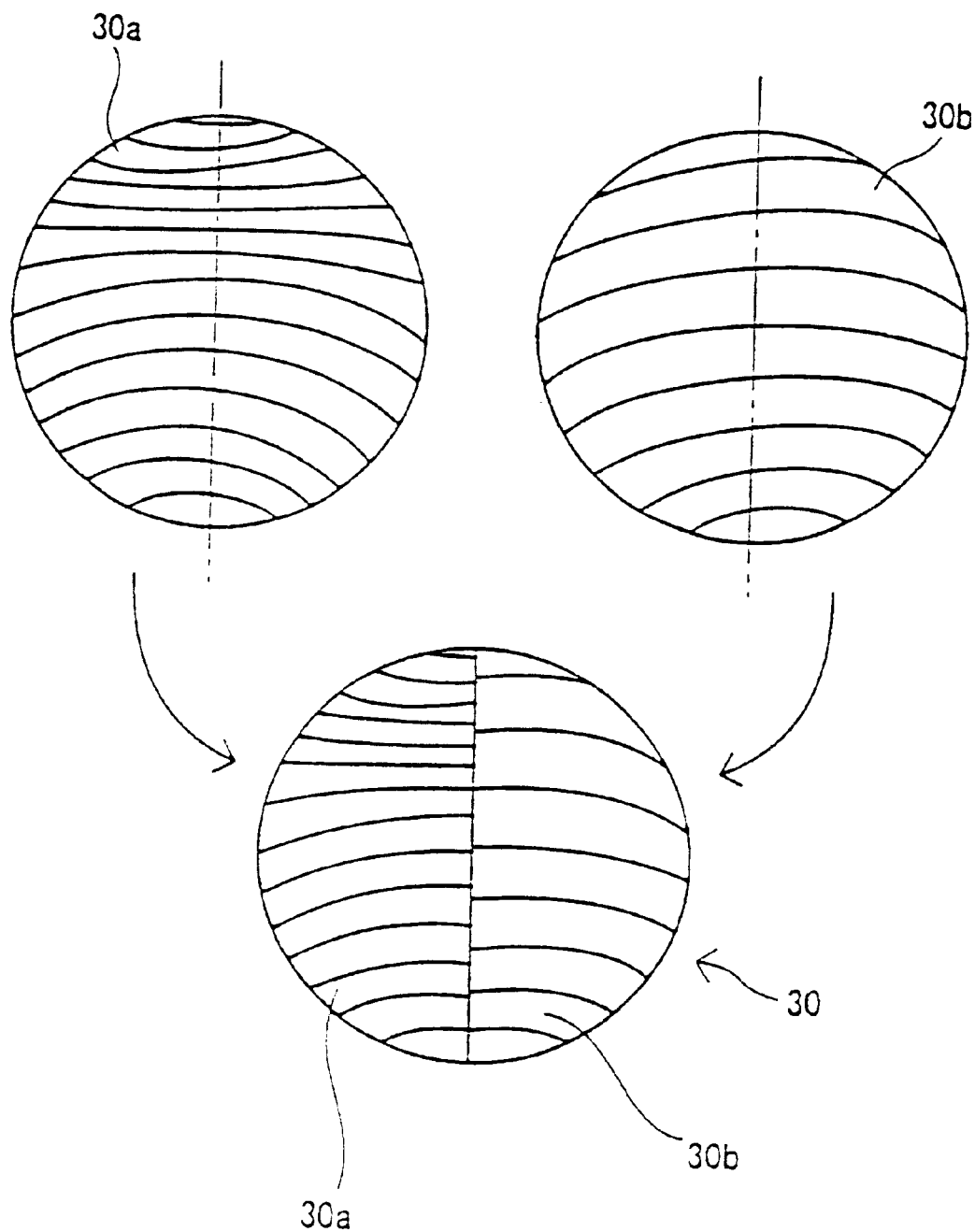
FIG. 3 is an illustrative view showing a hologram unit used in the FIG. 1 embodiment.
Figure 4:
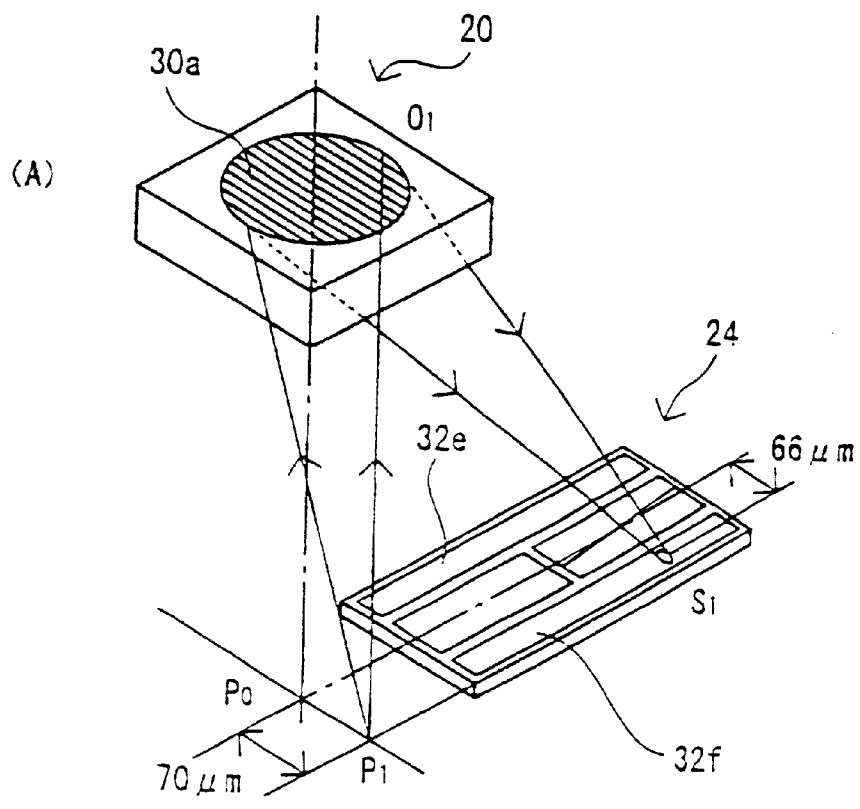
FIG. 4 is an illustrative view showing a design method for a hologram unit.
Figure 4:
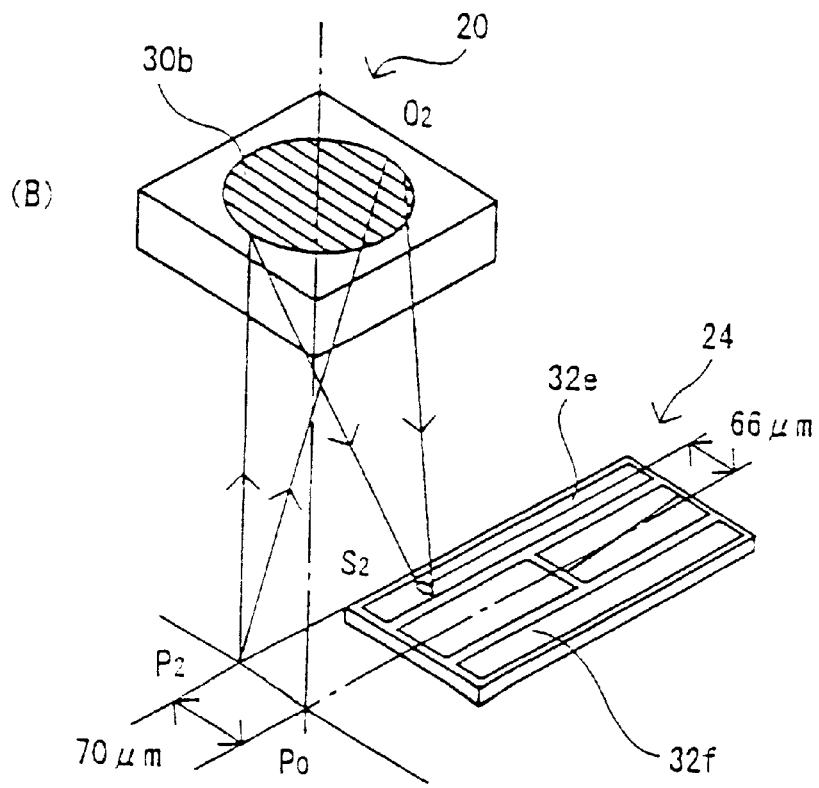

That is, as shown in FIG. 3, a first pattern 30a is designed on an entire circular region so that the sub-beam spot is minimized in size on the light receiving element based on an optical path length and waveform when +1-order sub-beam is taken as a light source. A second pattern 30b is designed on the entire circular region so that the sub-beam spot is minimized on the light receiving element based on an optical path length and wavelength when −1-order sub-beam is taken as a light source. These are divided into two and then joined together thereby obtaining a hologram pattern 30. Explaining in greater detail, when designing a first pattern 30a, the hologram unit 20 and the photodetector 24 are arranged in predetermined locations, as shown in FIG. 4(A). When it is assumed that a +1-order sub-beam has a virtual light source point of P1 and a convergence point on the light receiving element 32f of S1, a path of a point O1 on the hologram unit 20 is determined where the difference in the +1-order sub-beam optical path length (optical distance) between O1P1 and O1S1 (O1P1−O1S1) is $n\ \lambda$ (n=0, ±integer, $\lambda$: wavelength). This is taken as a first pattern 30a. On the other hand, a second pattern 30b is determined by a similar method based on a virtual light source point P2 and convergence point S of −1-order sub-beam, as shown in FIG. 4(B). Then, the first pattern 30a and the second pattern 30b are divided into two and then joined together. Incidentally, for an optical path length extending in the air and substrate 26, respective optical path lengths are determined by so-called ray-tracking calculation and then added together.

Figure 5:
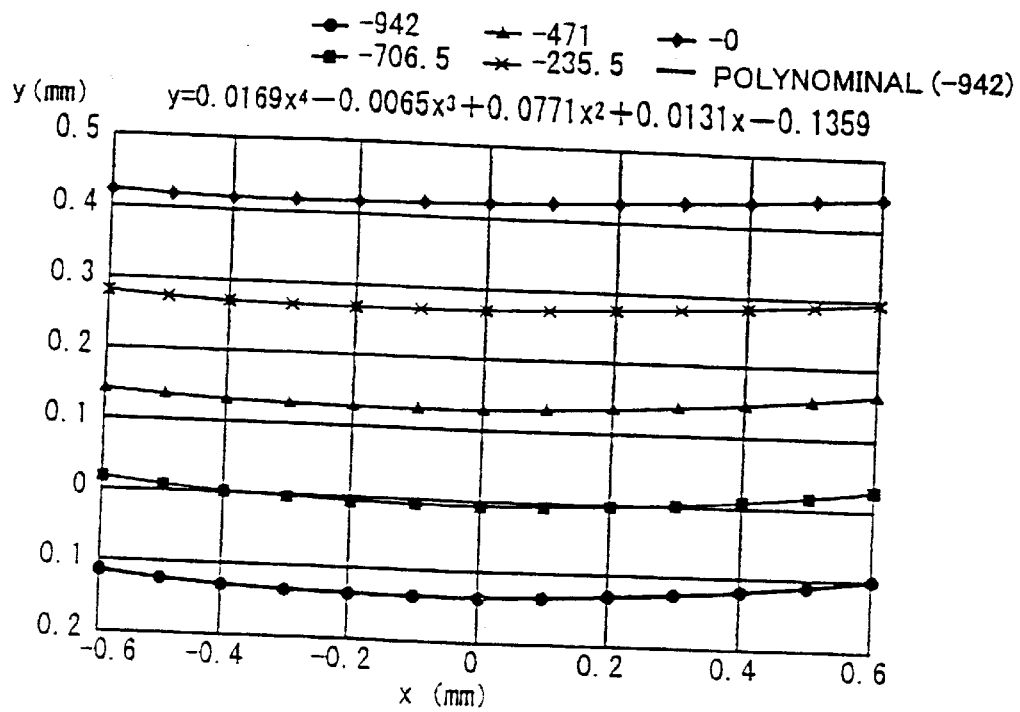
FIG. 5 is a graph illustrating a first pattern.
Figure 6:
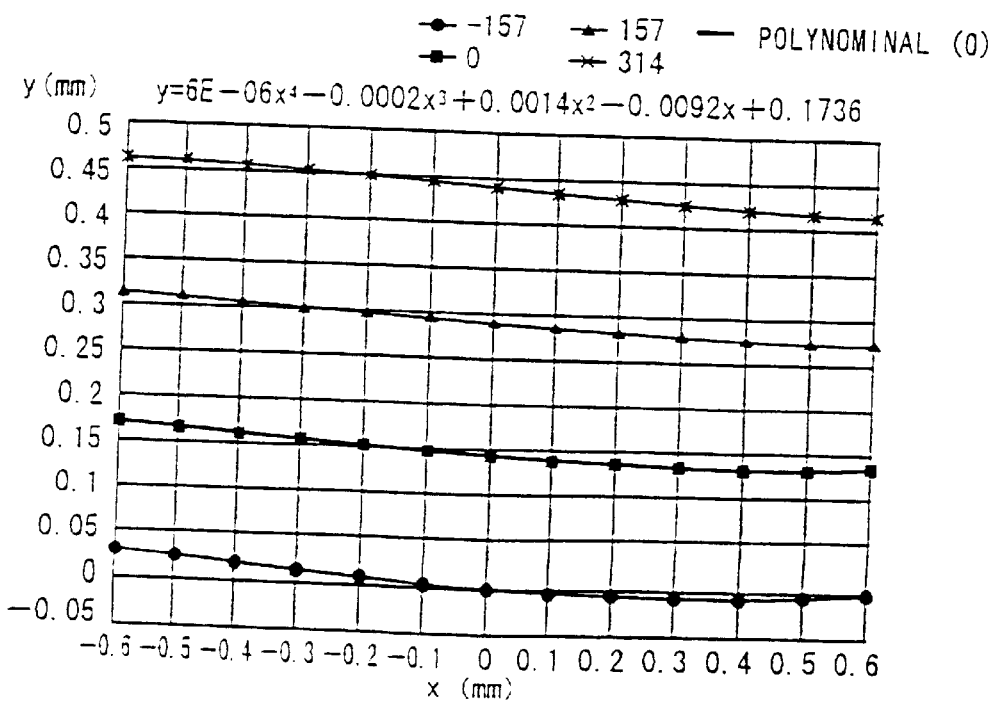
FIG. 6 is a graph illustrating a second pattern.
Figure 7:
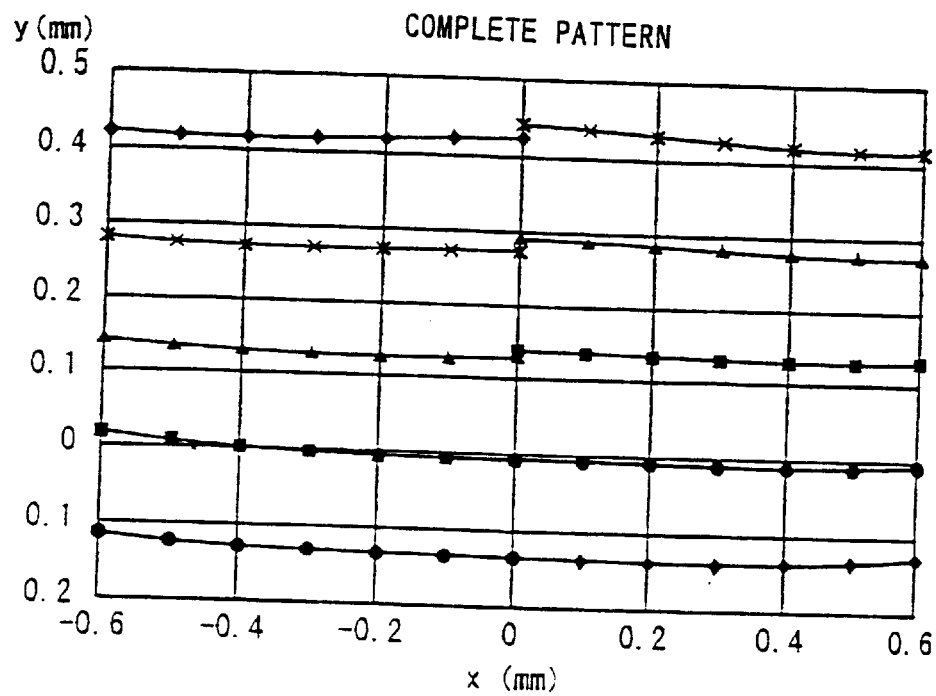
FIG. 7 is a graph illustrating a hologram pattern in combination of the first pattern and the second pattern.

For example, laser light is divided into three by using 16 $\mu$m pitch length of a grating pattern 28 to form a sub-beam spot on the disk 14 in a position spaced by ±13 $\mu$m from a main beam spot. In the case of converging the reflection light of this sub-beam to a position spaced by ±66 $\mu$m from a main-beam optical axis through the objective lens 22 and hologram pattern 30, the respective virtual light source points P1 and P2 of the sub-beams will deviate by ±70 $\mu$m from an actual light-emission point P0. Under this condition, a first pattern 30a shown in the graph of FIG. 5 and a second pattern 30b shown by a graph of FIG. 6 are obtained according to the above design method. Based on these patterns 30a and 30b, a hologram pattern 30 as shown in FIG. 7 is obtained. The first pattern 30a and the second pattern 30b can be expressed by a polynominal expression on the basis of $Ax^4+Dx^3+Bx^2+Ex+C$. That is, the first pattern 30a and the second pattern 30b in the hologram pattern 30 are configured by a pattern having odd-order dependency with respect to a distance x from a boundary line between them.

In operation, when a switch to the optical pickup 10 is turned on, the disk 14 is rotated by the disk motor 12 and the semiconductor laser device 16 is caused to emit light. Thereupon, the laser beam from the semiconductor device 16 is diffracted through the grating pattern 28 into a main beam and two sub-beams. The three beams divided by the grating pattern 28 pass through the hologram pattern 30 and then converge onto the disk 14 due to the objective lens 22. The light reflected by the disk 14 is passed through the objective lens 22 and then diffracted by the hologram pattern 30. Thus, the main beam converges on the light receiving elements 32a–32c of the photodetector 24 while the sub-beams are on the light receiving elements 32e and 32f. A focus error signal is determined from a difference of output signals between the light receiving elements 32a and 32b (S32a−S32b) while a tracking error signal is determined from a difference of output signals between the light receiving elements 32e and 32f (S32e−S32f).

Figure 8:
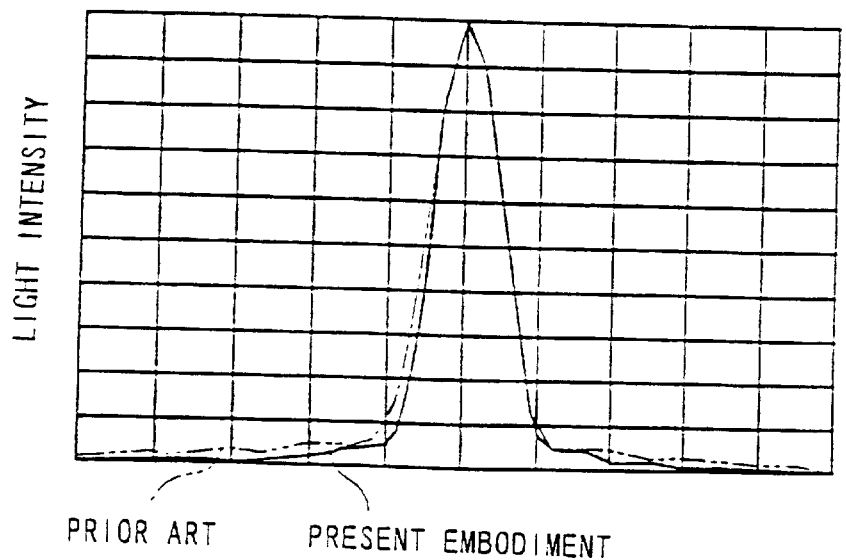
FIG. 8 is a graph illustrating a relationship between a distance from a sub-beam spot and a light intensity.
Figure 9:
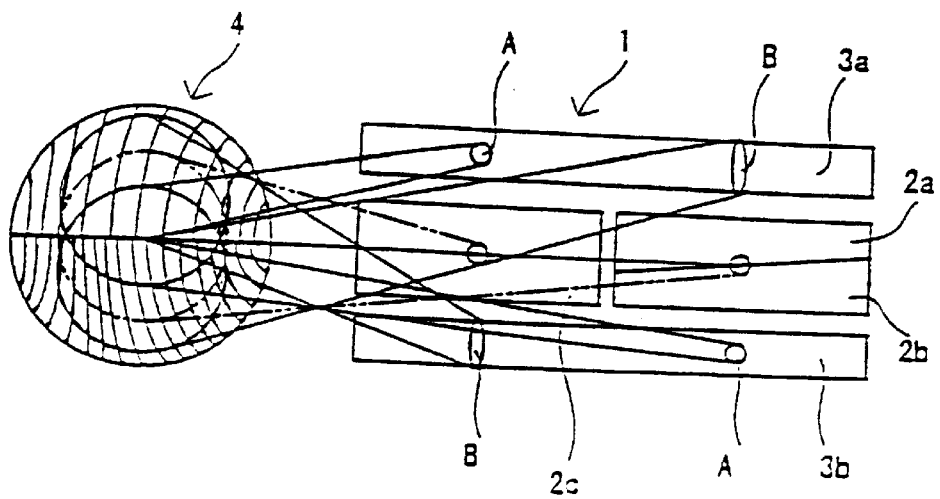
FIG. 9 is an illustrative view showing a prior art.
Figure 10:
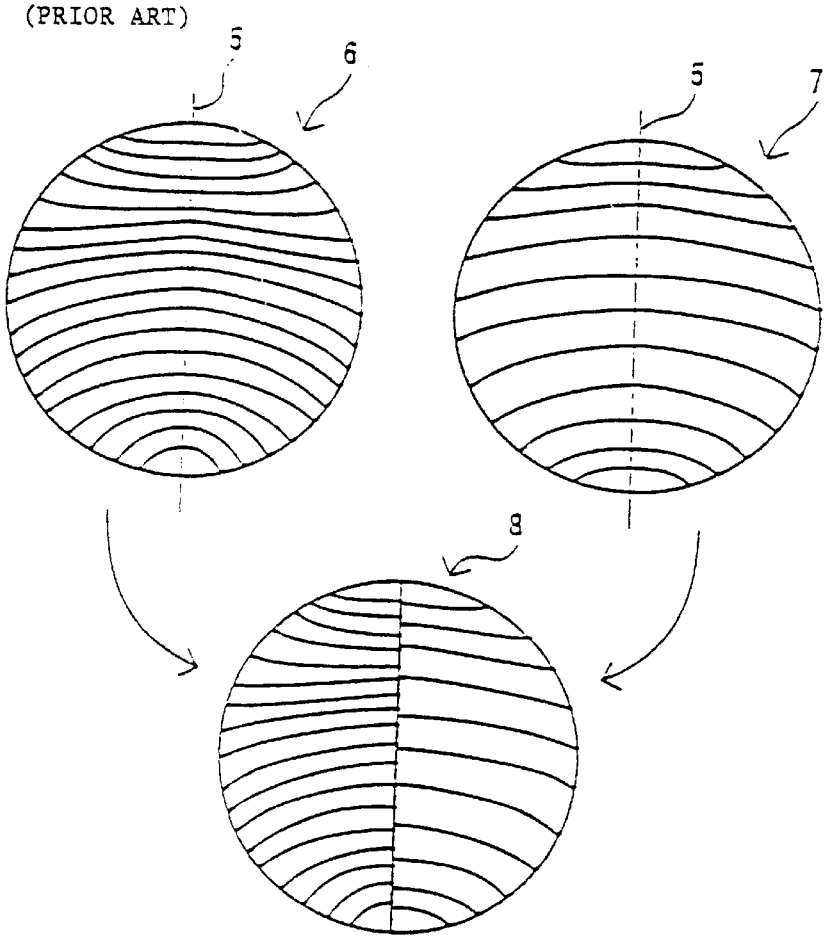
FIG. 10 is an illustrative view showing a conventional hologram pattern.

According to this embodiment, the hologram pattern 30 is designed such that the spot size of a sub-beam is minimized based on an optical path length and wavelength when the sub-beam is taken as a light source. Accordingly, there is no fear that a shade-side sub-beam goes out of the light-receiving surface. It is therefore possible to prevent against tracking-error balance or jitter due to temperature change thereby stabilizing the characteristics of the optical pickup 10. It is also possible to broaden an allowable range of attaching accuracy of the hologram unit 20, photodetector 24, etc. Incidentally, FIG. 8 is a graph illustrating a relationship between a distance from a center of a sub-beam and a light intensity when using the hologram pattern 30 shown in FIG. 7. In this graph, the sub-beam spot at a foot is greatly reduced in right intensity as compared to that of the prior art. It is to be understood from this that the spot size of the sub-beam is substantially decreased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup, comprising:
   a diffraction element for dividing a laser beam from a laser device into a main beam, a +1-order sub-beam and a −1-order sub-beam;

a lens for converging the main beam, the +1-order sub-beam and the −1-order sub-beam onto a disk;

a hologram unit divided into two of a first pattern and a second pattern to respectively diffract the main beam, the +1-order sub-beam, and the −1-order sub-beam reflected from said disk; and a photodetector including a first portion, a second portion, and a third portion to receive the main beam, the +1-order sub-beam and the −1-order sub-beam respectively diffracted by said first pattern and said second pattern;

wherein said first pattern is made to minimize the spot of the +1-order sub-beam converging onto said first portion based on an optical path length and a wavelength when the +1-order sub-beam is taken as a light source, and said second pattern is made to minimize the spot of the −1-order sub-beam converging onto said second portion based on an optical path length and a wavelength when the −1-order sub-beam is taken as a light source.

2. An optical pickup according to claim 1, wherein said first pattern and said second pattern are respectively configured by patterns each having an odd-order dependency with respect to a distance from a boundary line of them.

3. A hologram unit, comprising:

a hologram pattern for diffracting and converging onto a first light receiving element and a second light receiving element a +1-order sub-beam and a −1-order sub-beam reflected by a disk, said hologram pattern includes first and second patterns different in pitch length from each other, wherein said first pattern being made to minimize a spot of the +1-order sub-beam converging onto said first light receiving element based on an optical path length and a wavelength when the +1-order sub-beam is taken as a light source, and said second pattern is made to minimize the spot of the −1-order sub-beam converging onto said second light receiving element based on an optical path length and a wavelength when the −1-order sub-beam is taken as a light source.

4. A hologram unit according to claim 3, wherein said first and said second patterns are configured by patterns each having an odd-order dependency with respect to a distance from a boundary line of them.

\* \* \* \* \*